(12) United States Patent
Fukawatase

(10) Patent No.: US 9,156,420 B2
(45) Date of Patent: Oct. 13, 2015

(54) VEHICLE BEHAVIOR CONTROL APPARATUS

(71) Applicant: Toyota Jidosha Kabushiki Kaisha, Toyota-shi Aichi-ken (JP)

(72) Inventor: Osamu Fukawatase, Miyoshi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/321,918

(22) Filed: Jul. 2, 2014

(65) Prior Publication Data

US 2015/0008065 A1   Jan. 8, 2015

(30) Foreign Application Priority Data

Jul. 4, 2013   (JP) .................. 2013-140926

(51) Int. Cl.
*B60R 21/00* (2006.01)
*B60T 1/14* (2006.01)
*B62D 21/15* (2006.01)

(52) U.S. Cl.
CPC . *B60R 21/00* (2013.01); *B60T 1/14* (2013.01); *B62D 21/155* (2013.01)

(58) Field of Classification Search
CPC ...... B60R 19/56; B60R 19/565; B60R 21/00; B60R 21/16; B60R 21/36; B60R 2019/005; B60R 2021/0004; B60R 2021/0006; B60R 2021/0009; B60R 2021/0023; B60R 2021/0025; B60R 2021/23528; B60R 2021/346; B62B 5/049; B62D 21/15; B62D 21/155; B62D 21/157; B62D 25/20; B60B 39/00; B60T 1/14

USPC ........... 180/274, 276; 188/5; 280/728.1, 734, 280/743.1, 757, 762, 770; 293/6; 296/187.03, 187.08, 187.09, 187.1, 296/187.12, 193.07

See application file for complete search history.

(56) References Cited

U.S. PATENT DOCUMENTS

| | | | | |
|---|---|---|---|---|
| 3,167,154 | A * | 1/1965 | Salvetti | 188/5 |
| 3,219,135 | A * | 11/1965 | Bunting et al. | 180/127 |
| 3,662,852 | A * | 5/1972 | Taylor | 180/117 |
| 3,730,300 | A * | 5/1973 | Scherenberg | 188/5 |
| 3,768,599 | A * | 10/1973 | Alexandre et al. | 188/5 |
| 3,894,609 | A * | 7/1975 | Wulf | 180/164 |
| 4,019,698 | A * | 4/1977 | Earl | 244/110 A |
| 6,158,556 | A * | 12/2000 | Swierczewski | 188/5 |
| 6,227,325 | B1 * | 5/2001 | Shah | 180/274 |
| 6,450,556 | B1 * | 9/2002 | Jacobs | 293/107 |
| 6,463,372 | B1 | 10/2002 | Yokota et al. | |
| 6,883,631 | B2 * | 4/2005 | Hu et al. | 180/274 |
| 7,232,001 | B2 * | 6/2007 | Hakki et al. | 180/271 |
| 7,237,828 | B2 * | 7/2007 | Frederick et al. | 296/187.03 |
| 7,836,996 | B2 * | 11/2010 | Kitte et al. | 180/271 |

(Continued)

FOREIGN PATENT DOCUMENTS

| | | |
|---|---|---|
| JP | 2001-058552 A | 3/2001 |
| JP | 2003-511309 A | 3/2003 |
| JP | 2004-017664 A | 1/2004 |

(Continued)

*Primary Examiner* — Laura Freedman
(74) *Attorney, Agent, or Firm* — Gifford, Krass, Sprinkle, Anderson & Citkowski, P.C.

(57) ABSTRACT

A vehicle behavior control apparatus includes: a pair of underbody airbags that is provided in a lower portion of a vehicle on both sides in a vehicle width direction, and is inflated and deployed toward a road surface when being supplied with gas.

15 Claims, 5 Drawing Sheets

(56) References Cited

U.S. PATENT DOCUMENTS

| | | |
|---|---|---|
| 2005/0161273 A1 | 7/2005 | Makita et al. |
| 2007/0102963 A1 | 5/2007 | Frederick et al. |

FOREIGN PATENT DOCUMENTS

| | | | | |
|---|---|---|---|---|
| JP | 2005-035403 A | | 2/2005 | |
| JP | 2005081923 A | * | 3/2005 | .............. B60R 21/00 |
| JP | 2005199787 A | * | 7/2005 | .............. B60R 21/00 |
| JP | 2005-212551 A | | 8/2005 | |
| JP | 2006137322 A | * | 6/2006 | |
| JP | 2006137323 A | * | 6/2006 | |
| JP | 2006137325 A | * | 6/2006 | |
| JP | 2006256446 A | * | 9/2006 | |
| JP | 2006256485 A | * | 9/2006 | |
| JP | 2006264388 A | * | 10/2006 | |
| JP | 2006273040 A | * | 10/2006 | |
| JP | 2006273133 A | * | 10/2006 | |
| JP | 2006273136 A | * | 10/2006 | |
| JP | 2006273137 A | * | 10/2006 | |
| JP | 2006273139 A | * | 10/2006 | |
| JP | 2008-195261 A | | 8/2008 | |
| JP | 2010-018253 A | | 1/2010 | |
| WO | 0126952 A1 | | 4/2001 | |
| WO | 2010012082 A1 | | 2/2010 | |
| WO | WO 2010082352 A1 | * | 7/2010 | ................ B64C 1/06 |

* cited by examiner

VEHICLE BEHAVIOR CONTROL APPARATUS

INCORPORATION BY REFERENCE

The disclosure of Japanese Patent Application No. 2013440926 filed on Jul. 4, 2013 including the specification, drawings and abstract is incorporated herein by reference in its entirety.

BACKGROUND OF THE INVENTION

1. Field of the Invention

The present invention relates to a vehicle behavior control apparatus.

2. Description of Related Art

A technique has been known in which a body airbag is provided in each of right and left side members in a manner to be operable independently and the body airbag on a collision side is operated when an offset collision is predicted (see Japanese Patent Application Publication No. 2001-058552 (JP 2001-058552 A), for example).

Here, if a behavior of a vehicle can be controlled in accordance with a mode of a collision during a collision or before a collision of the vehicle, it contributes to improvement in collision safety performance of the vehicle.

SUMMARY OF THE INVENTION

The present invention provides a vehicle behavior control apparatus that can control a behavior of a vehicle in accordance with a mode of a collision.

A first aspect of the present invention relates to a vehicle behavior control apparatus. The vehicle behavior control apparatus includes a pair of underbody airbags that is provided on both sides in a vehicle width direction in a lower portion of a vehicle, and that is inflated and deployed to a road surface when being supplied with gas.

For example, when the gas is supplied to the underbody airbag that is arranged on one side in the vehicle width direction, the underbody airbag is inflated and deployed toward the road surface. Thus, the one side of the vehicle in the vehicle width direction is raised with respect to another side or is suppressed from sinking. In addition, for example, when the gas is supplied to the underbody airbags on both of the sides in the vehicle width direction, the right and left underbody airbags are inflated and deployed toward the road surface. Accordingly, friction between each of the underbody airbags and the road surface generates a braking force that acts on the vehicle. Since the gas is supplied to one or both of the right and left underbody airbags in accordance with a mode of a collision, it is possible to control a behavior of the vehicle in accordance with the mode of the collision.

As described above, according to the above aspect, the behavior of the vehicle can be controlled in accordance with the mode of the collision.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A description will be made on a vehicle behavior control apparatus 10 according to an embodiment of the present invention on the basis of FIG. 1 and FIG. 2. It should be noted that an arrow FR, an arrow UP, an arrow RH, and an arrow LH appropriately shown in each drawing respectively indicate a front direction, an upward direction, a right side as one side in a vehicle width direction, and a left side as the other side of an automobile V, to which the vehicle behavior control apparatus 10 is applied. When a description will hereinafter be made simply by using front/rear, up/down, and right/left directions, these directions respectively indicate the front/rear in a vehicle longitudinal direction, the up/down in a vehicle up-and-down direction, and the right/left of a vehicle (when the vehicle faces forward) unless otherwise specified.

[Schematic Configuration of Automobile V]

Figure 1A:
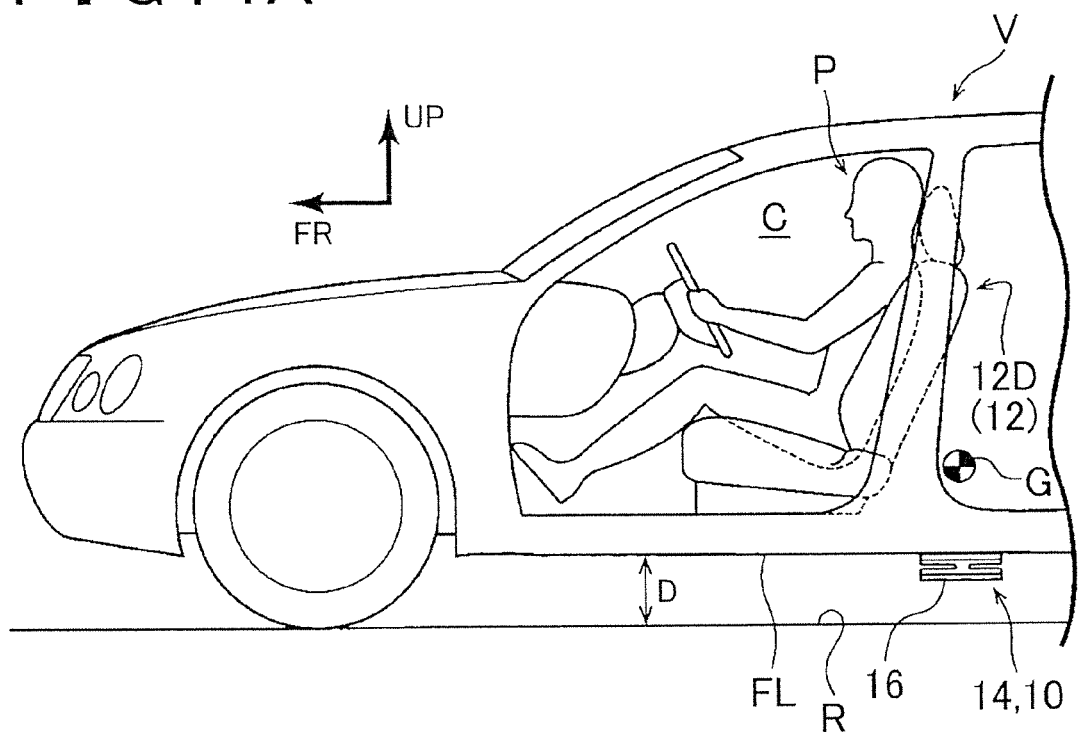
FIG. 1A is a view for showing an automobile to which a vehicle behavior control apparatus according to a first embodiment of the present invention is applied, and is also a side view in which a side door is not shown.
Figure 1B:
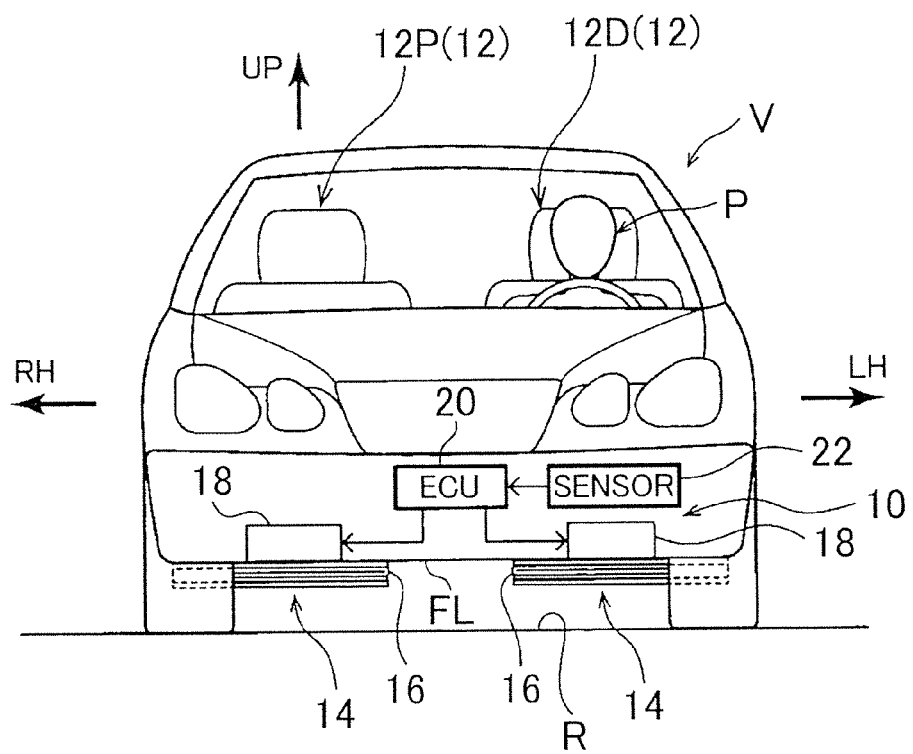
FIG. 1B is a view for showing the automobile to which the vehicle behavior control apparatus according to the first embodiment of the present invention is applied, and is also a front view.

FIG. 1A is a side view for showing a schematic configuration of the automobile V to which the vehicle behavior control apparatus 10 is applied and in which a side door is not shown. FIG. 1B is a front view for showing the schematic configuration of the automobile V. As shown in these drawings, the automobile V as the vehicle is provided with front seats 12 in a cabin C. The front seats 12 are provided in alignment with each other on the right and left. The front seat 12 that is located on the left side is a driver seat 12D, and the front seat 12 that is located on the right side is a passenger seat 12P.

Figure 2A:
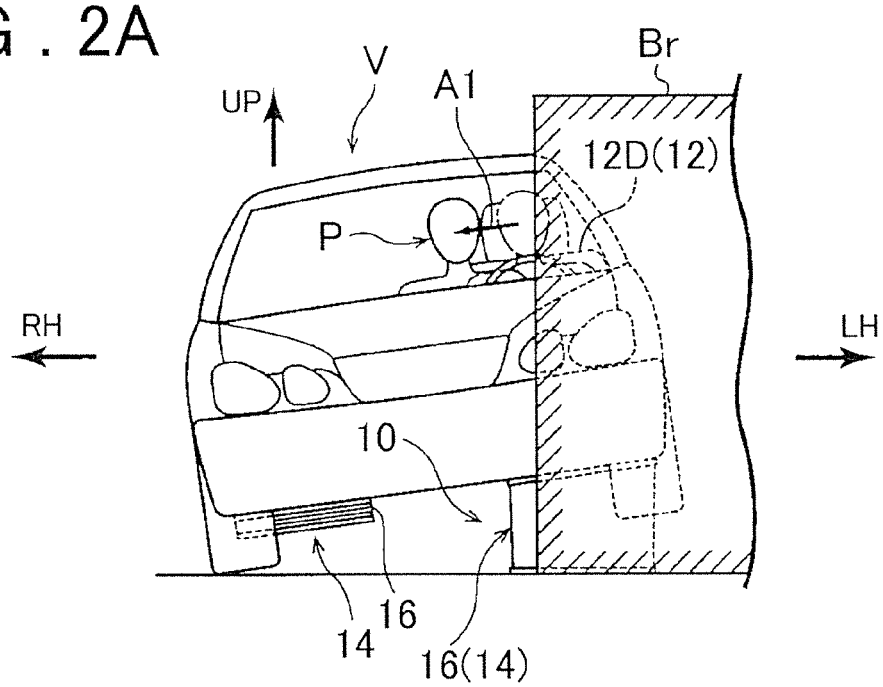
FIG. 2A is a view for showing an operation state of the vehicle behavior control apparatus according to the first embodiment of the present invention, and is also a front view.
Figure 2B:
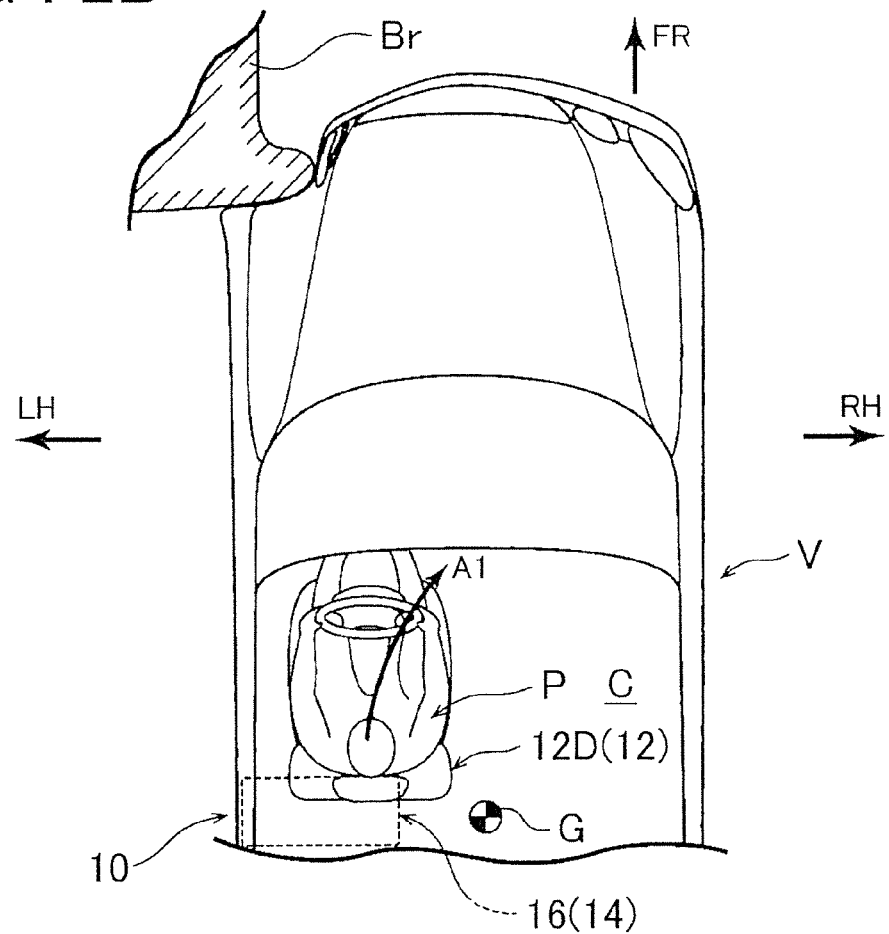
FIG. 2B is a view for showing the operation state of the vehicle behavior control apparatus according to the first embodiment of the present invention, and is also a plan view in which a roof is not shown.

As also shown in FIG. 2B as a plan view, center of gravity G of the automobile V in this embodiment is located at the center in the vehicle width direction and at the rear of the front seat 12.

[Underbody Airbag Device]

As shown in FIG. 1A and FIG. 1B, the vehicle behavior control apparatus 10 includes a right and left pair of underbody airbag devices 14. The underbody airbag device 14 is configured by including an underbody airbag 16 and an inflator 18 for supplying gas to the underbody airbag 16. In addition, the vehicle behavior control apparatus 10 includes a collision ECU 20 that is a control unit common to the right and left underbody airbag devices 14.

(Underbody Airbag)

The underbody airbag 16 is made of metal, and is configured to be inflated and deployed when being supplied with the gas since an opening end of an accordion-folded main body thereof is closed by a side plate. The underbody airbag 16 is fixed at an upper end side to a floor lower surface FL of the automobile V, and is inflated and deployed toward a road surface R when being supplied with the gas. An up-and-down dimension of the inflated and deployed underbody airbag 16 in a state with no load acting thereon is set to be longer than a distance D from the floor lower surface FL to a road surface R.

As shown in FIG. 1A, in this embodiment, the underbody airbag 16 is arranged such that the center of gravity G of the automobile V is located within an arrangement range thereof in a longitudinal direction in the side view. In other words, the underbody airbag 16 is configured to have a portion whose position in the longitudinal direction matches a position of the center of gravity G of the automobile V.

In addition, as shown in FIG. 1B, each of the right and left underbody airbags 16 extends from an outer end in the vehicle width direction of the floor lower surface FL to an inner side in the vehicle width direction in the front view. Although the underbody airbag 16 is shown to protrude from the floor lower surface FL in FIG. 1A and FIG. 1B, it may be configured that a part or all of the underbody airbag 16 does not protrude from the floor lower surface FL.

Furthermore, as a modified example of the underbody airbag 16, the main body may be formed of a base cloth in a bag shape that can be inflated and deployed when being supplied with the gas, and a protective material that is made of metal (such as an undercover) may be provided only in a lower portion of the main body that is a contact portion with the road surface R.

(Inflator)

The inflator 18 to be adopted is of combustion type, and supplies the generated gas to the inside of the underbody airbag 16 when being operated. Compared to an inflator used for an airbag device in the cabin C that directly protects a seated passenger P on the front seat 12, the inflator 18 according to this embodiment has a sufficiently large gas capacity.

Accordingly, the inflator 18 is configured to supply the gas to the metallic underbody airbag 16 such that the underbody airbag 16 can be inflated and deployed to have the longer up-and-down dimension than the distance D as described above in a short time from the initiation of the operation.

(Collision ECU)

The vehicle behavior control apparatus 10 includes the collision ECU 20 as the control unit. The collision ECU 20 is electrically connected to one or a plurality of collision sensors 22 (only one is shown in FIG. 1B). In addition, the collision ECU 20 is electrically connected to each of the inflators 18 for constituting the right and left underbody airbag devices 14.

Based on information from the collision sensor 22, the collision ECU 20 can detect or predict a frontal collision of the automobile V, to which the collision ECU 20 is applied, into a position that is offset to one side in the vehicle width direction. As such a frontal collision into the position that is offset to the one side in the vehicle width direction, a small overlap collision or an oblique collision can be raised.

Of the frontal collisions of the automobile V, the small overlap collision refers to a collision that is defined by IIHS to have no more than 25% of an overlapping quantity in the vehicle width direction with another party of collision, for example. For example, a collision against a front side member as a vehicle body frame to the outer side in the vehicle width direction corresponds to the small overlap collision. In this embodiment, the small overlap collision at a relative speed of 64 km/hr is assumed as an example. Meanwhile, the oblique collision (an MDB oblique collision or a diagonal collision) refers to a collision oblique to the front that is defined by NSHTA, for example (as an example, a collision having a relative angle of 15° and approximately 35% of the overlapping quantity in the vehicle width direction with the other party of collision). In this embodiment, the oblique collision at the relative speed of 90 km/hr is assumed as an example.

When predicting or detecting the frontal collision into the position that is offset to the one side in the vehicle width direction, the collision ECU 20 selectively operates only the inflator 18 of the underbody airbag device 14 on a collision side in the vehicle width direction.

[Advantage]

Next, an advantage of the present invention will be described.

A description will hereinafter be made on an advantage in a case where the collision ECU 20 detects the small overlap collision of a barrier Br into the driver seat 12D side as the frontal collision into the position that is offset to the one side in the vehicle width direction.

When predicting or detecting the small overlap collision or the oblique collision on the basis of a signal from the collision sensor 22, the collision ECU 20 operates the inflator 18 of the underbody airbag device 14 on the collision side, that is, on the driver seat 12D side (left side) in this embodiment. Then, the underbody airbag 16 on the left side is supplied with the gas from the inflator 18, and is inflated and deployed toward the road surface R. Since a longitudinal position of the underbody airbag 16 matches that of the center of gravy G of the vehicle, as shown in FIG. 2A, the collision side of the automobile V is lifted with respect to an anti-collision side. In other words, the automobile V is tilted such that the collision side is raised in the front view. In FIG. 2B, the underbody airbag 16 that has been inflated and deployed is shown by a broken line. In FIG. 2A and FIG. 2B, the passenger seat 12P is not shown.

In a comparative example that is not provided with the vehicle behavior control apparatus 10, while the vehicle moves in a direction to separate from the barrier Br (to the right side as the anti-collision side in this example) in conjunction with progression of the collision, a moving direction of the seated passenger P on the driver seat 12D by inertia is substantially straight to the front. Thus, the seated passenger P relatively moves within the cabin C to the outer side in the vehicle width direction, that is, to the collision side.

Meanwhile, in this embodiment, the automobile V is tilted by the inflation and deployment of the underbody airbag 16 such that the collision side is raised as described above. Accordingly, as indicated by an arrow A1 in FIG. 2A and FIG. 2B, a force that is directed to move the seated passenger P to the anti-collision direction acts by gravity, and the seated passenger P is thus suppressed within the cabin C from moving to the outer side in the vehicle width direction, that is, to the collision side. Therefore, protective performance for the seated passenger P against the frontal collision into the position that is offset to the one side in the vehicle width direction such as the small overlap collision is improved.

Second Embodiment

Figure 3:
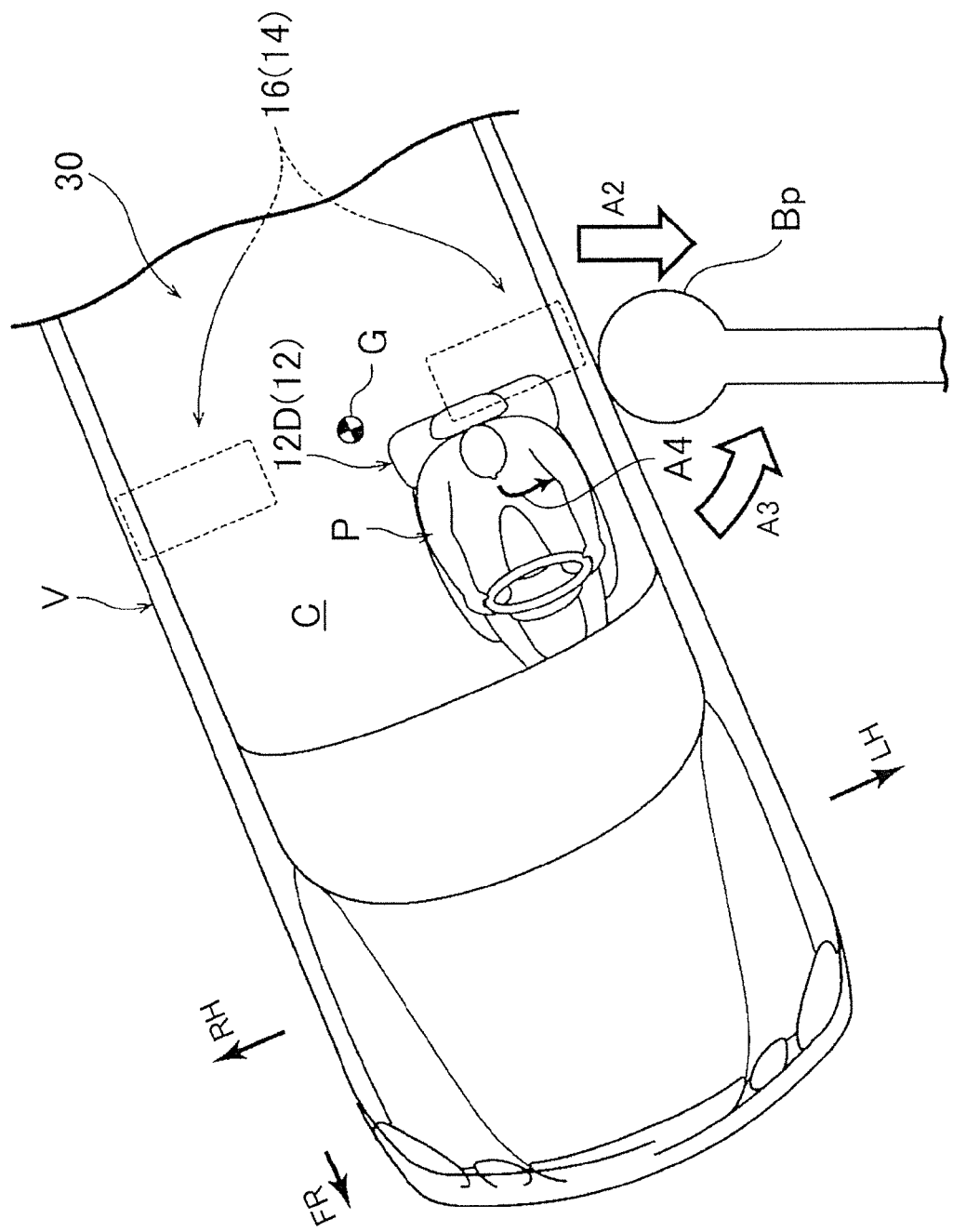
FIG. 3 is a plan view for showing the operation state of the vehicle behavior control apparatus according to a second embodiment of the present invention and in which the roof is not shown.

A description will be made on a vehicle behavior control apparatus 30 according to a second embodiment of the present invention on the basis of FIG. 3. It should be noted that components that are basically the same as those of the first embodiment are denoted by the same reference numerals as those of the first embodiment, and the description and illustration thereof may not be repeated.

While a mechanical structure of the vehicle behavior control apparatus 30 according to the second embodiment is configured in the same manner as that of the vehicle behavior control apparatus 10 according to the first embodiment, the vehicle behavior control apparatus 30 differs from the vehicle behavior control apparatus 10 in the control executed by the collision ECU 20. A specific description thereon will be made below.

The collision ECU 20 for constituting the vehicle behavior control apparatus 30 can detect or predict the oblique collision into a side surface of the automobile V on the basis of the information from the collision sensor 22. As an example of such an oblique collision, a pole side collision can be raised. Here, the pole side collision refers to a mode of collision in which the automobile V obliquely collides with a pole barrier Bp from the side surface at an angle of 75° (see an arrow A2). Then, when detecting or predicting the pole side collision, the collision ECU 20 operates both of the inflators 18 of the paired underbody airbag devices 14.

[Advantage]

When detecting or predicting the pole side collision on the basis of the signal from the collision sensor 22, the collision ECU 20 operates both of the inflators 18 of the paired underbody airbag devices 14. This side collision is a mode of the oblique collision into the side surface in which the vehicle collides with a collision object such as a pole while slipping to the side, for example. Then, on both of the right and left sides of the center of gravity G of the automobile V, the underbody airbags 16 are supplied with the gas from the inflators 18 and are inflated and deployed toward the road surface R. FIG. 3 shows the inflated and deployed underbody airbags 16 on both sides by broken lines.

Thereafter, the right and left underbody airbags 16, which have been inflated and deployed, are pressed against the road surface, and friction generated by this reduces the speed of the automobile V. Accordingly, a collision speed of the automobile V against the pole barrier Bp is reduced. Thus, compared to a comparative example that is not provided with the vehicle behavior control apparatus 30, deformation of a vehicle body is suppressed, and the protective performance for the seated passenger P is improved. More specifically, after the collision against the pole barrier Bp, the automobile V rotates in an arrow A3 direction. In conjunction with the rotation, the seated passenger P moves within the cabin C to the collision side in the vehicle width direction that is indicated by an arrow A4. Here, since the collision speed is reduced as described above, the behaviors of the automobile V and the seated passenger P to respectively move to the arrow A3 and arrow A4 directions are suppressed, and thus the protective performance for the seated passenger P is improved as described above.

Third Embodiment

A description will be made on a vehicle behavior control apparatus 40 according to a third embodiment of the present invention on the basis of FIG. 4 and FIG. 5. It should be noted that components that are basically the same as those of the first embodiment are denoted by the same reference numerals as those of the first embodiment, and the description and illustration thereof may not be repeated.

Figure 4:
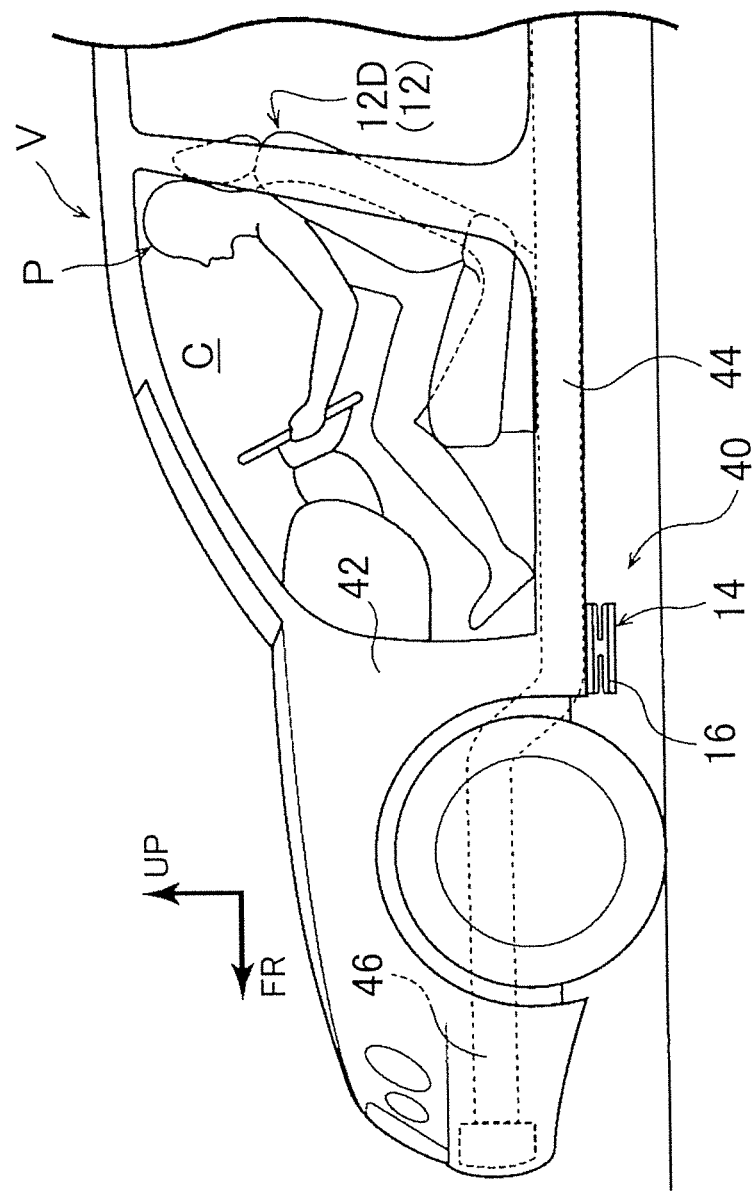
FIG. 4 is a side view for showing the automobile to which the vehicle behavior control apparatus according to a third embodiment of the present invention is applied and in which the side door is not shown.

As shown in FIG. 4, the vehicle behavior control apparatus 40 differs from the vehicle behavior control apparatus 10 in a point that the right and left underbody airbag devices 14 are located in a lower portion of or below a front pillar 42. In this embodiment, an outer end side of the underbody airbag device 14 in the vehicle width direction is arranged just below the front pillar 42 or just below a front end of a rocker 44 to which a lower end of the front pillar 42 is connected.

In addition, when predicting or detecting the frontal collision into the position that is offset to the one side in the vehicle width direction, the collision ECU 20 that constitutes the vehicle behavior control apparatus 40 selectively operates only the inflator 18 of the underbody airbag device 14 on the collision side in the vehicle width direction.

[Advantage]

Figure 5A:
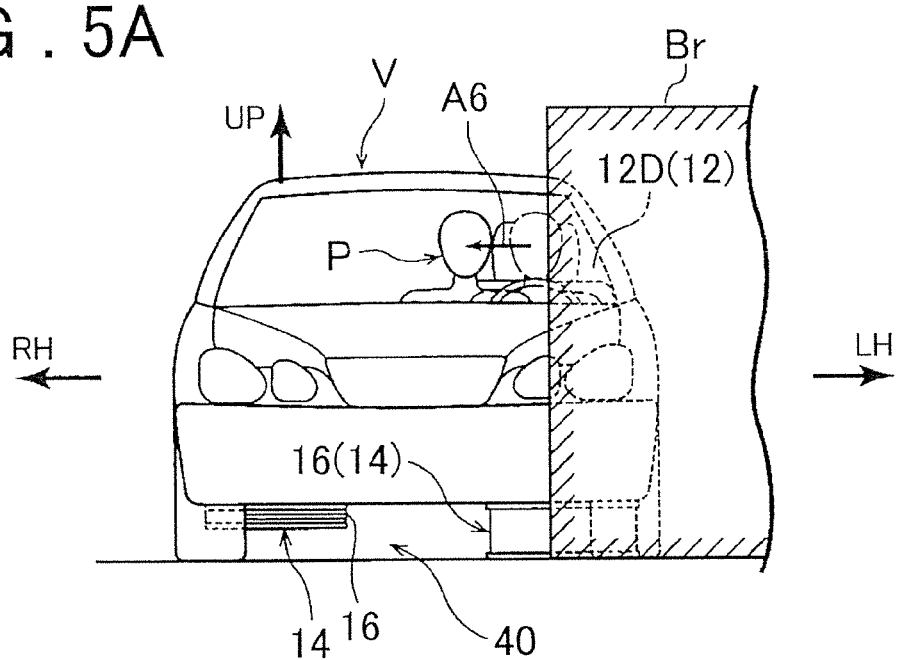
FIG. 5A is a view for showing the operation state of the vehicle behavior control apparatus according to the third embodiment of the present invention, and is also a front view.
Figure 5B:
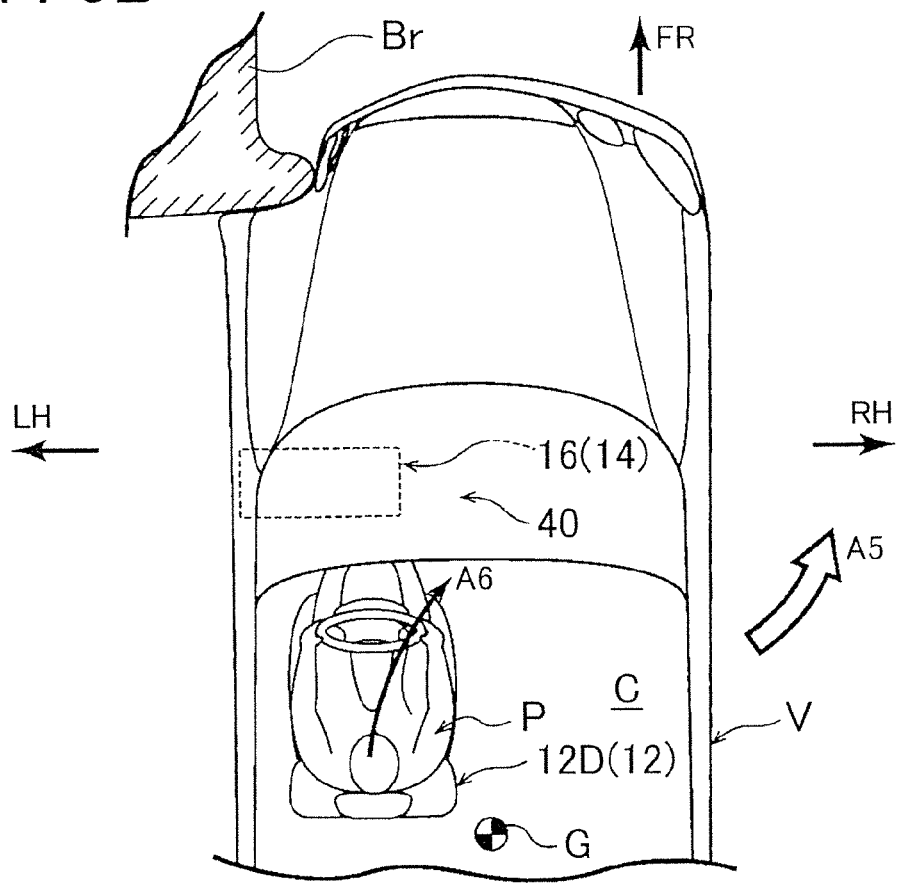
FIG. 5B is a view for showing the operation state of the vehicle behavior control apparatus according to the third embodiment of the present invention, and is also a plan view in which the roof is not shown.

When predicting or detecting the small overlap collision or the oblique collision on the basis of the signal from the collision sensor 22, the collision ECU 20 operates the inflator 18 of the underbody airbag device 14 on the collision side, that is, the driver seat 12D side (left side) in this embodiment. Then, as shown in FIG. 5A and FIG. 5B, the underbody airbag 16 on the left side is supplied with the gas from the inflator 18, and is inflated and deployed toward the road surface R. In FIG. 5B, the underbody airbag 16 on the collision side (left side) that has been inflated and deployed is shown by the broken line.

The underbody airbag 16 on the left side, which has been inflated and deployed, is pressed against the road surface, and the friction generated by this reduces the speed of the automobile V. Accordingly, the collision speed of the automobile V against the barrier Br is reduced. Thus, compared to a comparative example that is not provided with the vehicle behavior control apparatus 40, the deformation of the vehicle body is suppressed, and the protective performance for the passenger is improved.

In addition, the collision is progressed while the speed of the automobile V is reduced on the left side by the underbody airbag 16. Thus, compared to a case where the speed thereof is not reduced by the underbody airbag 16 on the left side, the automobile V drastically rotates in a direction that is indicated by an arrow A5 in FIG. 5B. Accordingly, in conjunction with the rotation of the automobile V, the seated passenger P on the driver seat 12D moves to the right, that is, in a direction to separate from the barrier Br.

Furthermore, while the automobile V is tilted in the plan view (tilted such that the rear side is positioned on the right side with respect to the front side) by the rotation in the arrow A5 direction with respect to a traveling direction before the collision, the seated passenger P moves in the traveling direction before the collision by the inertia. Then, compared to the comparative example that is not provided with the vehicle behavior control apparatus 40, the seated passenger P moves within the cabin C to the front while separating from the front pillar 42 on the collision side as indicated by an arrow A6 in FIG. 5A and FIG. 5B.

Moreover, in the comparative example that is not provided with the vehicle behavior control apparatus 40, the automobile V behaves as if a front portion thereof sinks due to deceleration by braking before the collision or due to deformation of a front side member 46 (see FIG. 4) or the like that is associated with the collision. On the other hand, in this embodiment, since the underbody airbag 16 is inflated and deployed below the front pillar 42 and is pressed against the road surface R, the front portion of the automobile V is suppressed from sinking on the collision side. This can suppress movement of the seated passenger P who wears a seatbelt from falling to the front.

As described above, the movement of the seated passenger P in the cabin C to the front pillar 42 side, which is the collision side, is suppressed, and the movement of the seated passenger P to fall to the front is also suppressed. Thus, the protective performance for the seated passenger P is improved. In other words, it is possible to prevent or effectively suppress the seated passenger P from interfering with the front pillar 42. In addition, even when the seated passenger P interferes with a structure in the vehicle, a speed during the interference is reduced. Furthermore, the seated passenger P that shows a behavior as described above is likely to be properly protected by a front-seat airbag device, for example.

In the above first and third embodiments, an example in which the inflator 18 is operated in the small overlap collision and the oblique collision is described; however, the present invention is not limited thereto. For example, it may be configured that the inflator 18 is operated in only one of the small overlap collision and the oblique collision. In such a configuration, when another of the small overlap collision and the oblique collision occurs, the passenger is protected by another safety device.

In addition, the second embodiment is described as the embodiment that is independent of the first embodiment; however, the present invention is not limited thereto. For example, it may be configured that the control of the first embodiment and that of the second embodiment are concurrently executed.

Furthermore, the present invention only needs to be provided with the right and left pair of the underbody airbag devices 14, and the control of the paired underbody airbag devices 14 is not limited to the each control described above. For example, in each of the embodiments, the inflators 18 of the right and left underbody airbag devices 14 may be operated in a full-overlap frontal collision.

Moreover, it may be configured that the plural underbody airbag devices 14 are provided on the each side in the vehicle width direction. In this case, if the underbody airbag devices 14 are arranged in a symmetrical manner with respect to the center of gravity G in the longitudinal direction, the first and second embodiments can adopt a configuration in which the underbody airbag device 14 whose longitudinal direction matches the center of gravity G is not provided. In addition, one each (a total of four) of the underbody airbag devices 14 may be disposed in the positions in the first and third embodiments, for example.

In addition to the above, it is needless to say that various modifications can be made to the present invention without departing from the scope of the gist thereof.

What is claimed is:

1. A vehicle behavior control apparatus comprising:
    a pair of underbody airbags that is provided in a lower portion of a vehicle on both sides in a vehicle width direction and each of the pair of underbody airbags is inflated and deployed toward a road surface when being supplied with gas,
    the pair of underbody airbags is arranged on both of the sides in the vehicle width direction with respect to a center of gravity of the vehicle so as to have a portion whose position matches a position of the center of gravity in a vehicle longitudinal direction, and
    the gas is supplied to one of the pair of underbody airbags on a collision side during a frontal collision into a position that is offset to one side in the vehicle width direction.

2. The vehicle behavior control apparatus according to claim 1, wherein
    the gas is supplied to both of the pair of underbody airbags during a full-overlap frontal collision.

3. The vehicle behavior control apparatus according to claim 1, wherein
    an up-and-down dimension of each of the pair of underbody airbags in an inflated and deployed state with no load acting thereon is set to be longer than a distance from a floor lower surface to the road surface.

4. The vehicle behavior control apparatus according to claim 1, wherein
    each of the pair of underbody airbags is made of metal, and each of the pair of underbody airbags is folded into accordion shape.

5. The vehicle behavior control apparatus according to claim 1, wherein
    each of the pair of underbody airbags includes a main body formed of a base cloth in a bag shape that can be inflated and deployed when being supplied with the gas, and a protective material that is made of metal is provided only in a lower portion of the main body that is a contact portion with the road surface.

6. A vehicle behavior control apparatus comprising:
    a pair of underbody airbags that is provided in a lower portion of a vehicle on both sides in a vehicle width direction and each of the pair of underbody airbags is inflated and deployed toward a road surface when being supplied with gas,
    the pair of underbody airbags is arranged on both of the sides in the vehicle width direction with respect to center of gravity of the vehicle so as to have a portion whose position matches a position of the center of gravity in a vehicle longitudinal direction, and
    the gas is supplied to both of the pair of underbody airbags during an oblique collision against a side surface of the vehicle.

7. The vehicle behavior control apparatus according to claim 6, wherein
    the gas is supplied to both of the pair of underbody airbags during a full-overlap frontal collision.

8. The vehicle behavior control apparatus according to claim 6, wherein
    an up-and-down dimension of each of the pair of underbody airbags in an inflated and deployed state with no load acting thereon is set to be longer than a distance from a floor lower surface to the road surface.

9. The vehicle behavior control apparatus according to claim 6, wherein
    each of the pair of underbody airbags is made of metal, and each of the pair of underbody airbags is folded into accordion shape.

10. The vehicle behavior control apparatus according to claim 6, wherein
    each of the pair of underbody airbags includes a main body formed of a base cloth in a bag shape that can be inflated and deployed when being supplied with the gas, and a protective material that is made of metal is provided only in a lower portion of the main body that is a contact portion with the road surface.

11. A vehicle behavior control apparatus comprising:
    a pair of underbody airbags that is provided in a lower portion of a vehicle on both sides in a vehicle width direction and each of the pair of underbody airbags is inflated and deployed toward a road surface when being supplied with gas,
    the pair of underbody airbags is arranged in lower portions of or below right and left front pillars, and the gas is supplied to one of the pair of underbody airbags on a collision side during a frontal collision into a position that is offset to one side in the vehicle width direction.

12. The vehicle behavior control apparatus according to claim 11, wherein
the gas is supplied to both of the pair of underbody airbags during a full-overlap frontal collision.

13. The vehicle behavior control apparatus according to claim 11, wherein
an up-and-down dimension of each of the pair of underbody airbags in an inflated and deployed state with no load acting thereon is set to be longer than a distance from a floor lower surface to the road surface.

14. The vehicle behavior control apparatus according to claim 11, wherein
each of the pair of underbody airbags is made of metal, and each of the pair of underbody airbags is folded into accordion shape.

15. The vehicle behavior control apparatus according to claim 11, wherein
each of the pair of underbody airbags includes a main body formed of a base cloth in a bag shape that can be inflated and deployed when being supplied with the gas, and a protective material that is made of metal is provided only in a lower portion of the main body that is a contact portion with the road surface.

* * * * *